Patented June 5, 1951

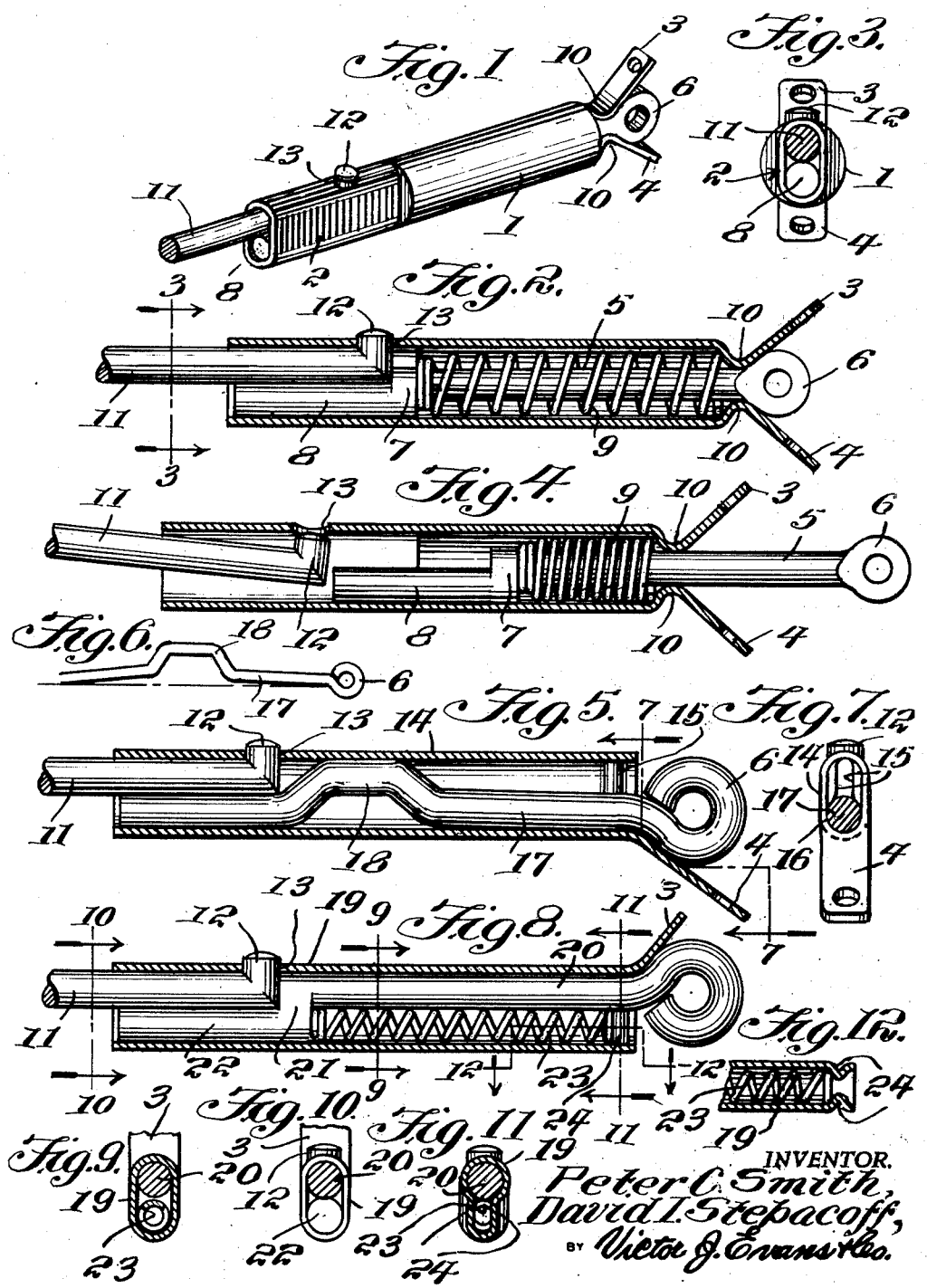

2,556,117

UNITED STATES PATENT OFFICE 2,556,117

SPRING COUPLING

Peter C. Smith and David I. Stepacoff,
Perth Amboy, N. J.

Application July 16, 1947, Serial No. 761,236

3 Claims. (Cl. 24—201)

Our present invention relates to the general class of fishing tackle and implements, and more specifically to an improved spring coupling of the resiliently locked type, which while adapted for various uses and purposes, is especially designed and embodied in a quick detachable and separable fastener employed as a coupling in the tackle between the hook and its lead line or lines.

The primary object of the invention is the provision of a spring locked coupling of this type that may with facility be manufactured at low cost of production, and its parts may be assembled with convenience to insure a device that is simple in construction and operation and which is durable and efficient in the performance of its functions.

The invention consists in certain novel features of construction and combinations and arrangements of parts involving a tubular housing, a spring actuated slide pin, and a fish hook, together with co-acting means forming parts of these elements for locking the hook, as will be explained hereinafter, and more particularly set forth in the appended claims.

In the accompanying drawings a complete example of a physical embodiment of the invention is illustrated wherein the parts are combined and arranged in accord with a mode we have devised for the practical application of the principles of the invention. It will however be understood that changes and alterations are contemplated and may be made in these exemplifying drawings and mechanical structures, as is evidenced by the modifications of the invention illustrated in the drawings, and these changes may be made within the scope of our claims without departing from the principles of the invention.

Figure 1 is a perspective view of a coupling in which the invention is embodied and showing the shank of a fish hook locked therein.

Figure 2 is a longitudinal sectional view of the coupling in Fig. 1, with the hook locked in place.

Figure 3 is a vertical or transverse section at line 3—3 of Fig. 2; and

Figure 4 is a longitudinal sectional view similar to Fig. 2, with the hook-shank in uncoupling position.

Figure 5 is a longitudinal sectional view showing a modified form of the spring coupling; Figure 6 is a detail view of the resilient coupling pin; and Figure 7 is a transverse sectional view at line 7—7 of Fig. 5.

Figure 8 is a further modification of the invention showing the spring coupling with the shank of the fish hook in locked position.

Figure 9 is a transverse sectional view at line 9—9 in Fig. 8; and Figures 10, 11, and 12 are sectional views at lines 10—10, 11—11, and 12—12, in Fig. 8.

In Figs. 1 through 4, a tubular housing 1 of metal or other suitable material, is fashioned with a main cylindrical portion, and a flattened portion 2 with rounded ends, and the inner or upper end of the housing is provided with integral outwardly flaring perforated ears or lugs 3 and 4 for attachment to parts of the fishing tackle.

Within the housing is mounted a reciprocable coupling pin or slide bolt 5 having an exterior eye 6 for use as an attaching head, and within the housing the coupling pin is provided with a transversely extending enlarged head 7 and an axially offset end 8 that, together with the head forms an abutment or shoulder.

A helical spring 9 is coiled about the pin 5 and interposed between the head 7 and a restricted neck portion at the end of the housing formed by inset crimps 10, 10 at the bases of the perforated ears 3 and 4 of the housing, and it will be apparent that the spring tends to urge the coupling pin to locked position as in Fig. 2.

The coupling pin is designed to co-act with and lock a fish hook within the flattened portion 2 of the housing, and the number 11 indicates the shank of a conventional fish hook that may be readily inserted in the open end of the housing. The shank 11 and the end 8 of the pin are of solid cylindrical shape to fit neatly within the flattened portion of the housing, and the shank 11 of the fish hook is provided with a radially projecting head 12 that is adapted to slip into an aperture 13 in the wall of the flattened portion.

The headed end of the shank abuts against the shoulder or head 7 of the pin, and by close frictional contact between the parallel shank and pin-end, and under tension of the spring, the fish hook is locked in rigid and stabilized position within the housing. These parts may readily be uncoupled by withdrawing the coupling pin, as in Fig. 4, and then the fish hook may be withdrawn from its housing for repairs, replacement, or the substitution of other types of fish hooks.

In Figs. 5, 6, and 7 a modified form of the invention is illustrated, which includes a flattened tubular housing 14 having a single perforated ear 4 and the opening or socket 13, and the reduced neck of the housing is formed by internal crimps 15, 15, and an end bore 16 for guiding and retaining the integral resilient coupling pin 17. This pin 17 is fashioned with an offset integral hump 18 which adds to its resiliency, and the hump by inherent elasticity of the pin is held in frictional contact with one wall of the flattened housing while the main portion of the pin is held in frictional contact with the opposite wall of the housing.

One end of the hump forms a shoulder or seat for the head 12 of the fish hook shank 11, and the inner end of the pin is held in close frictional contact with the parallel shank of the fish hook, to retain the hook in operative position.

A further modification of the invention is shown in Figs. 8 through 12 where the flattened housing 19 is provided with an attaching perforated ear as 3, and the socket or apertures 13, and the coupling pin 20 is fashioned with a transverse head 21 and an offset end 22 for co-action in retaining the shank 11 in locked position. A helical spring 23 is mounted in the housing parallel to the pin 20 and interposed between head 21 and crimped portions 24 of the casing 19. The crimps 24 of the housing 19 retain the spring in operative position in the housing, and the shank of the fish hook is locked, and unlocked, in the manner heretofore described.

Having thus fully described our invention, what we claim as new and desire to secure by Letters Patent is:

1. In a spring coupling, the combination with a housing, of a reciprocable coupling pin mounted in the housing, said pin having a transverse head and an offset end, a spring interposed between the head and the end of the housing, of a shank mounted in the housing and having a radial head and engaged in a socket of the housing, and said shank and offset end being held in parallel frictional engagement by pressure of the spring.

2. In a spring coupling, the combination with a housing having inwardly bent and outwardly flaring end perforated ears and a spaced socket, of a coupling pin mounted in the housing, a transverse head on the pin and an integral offset end projecting from said head, a spring interposed between the transverse head and said ears, a shank mounted in the housing, and a radial locking head on said shank engaged in said socket.

3. In a coupling, the combination with a housing, of a reciprocable coupling pin mounted in the housing, said pin having a transverse head and an offset end, resilient means interposed between the head and the end of the housing, of a shank mounted in the housing and having a head engaged in a socket of the housing, and said shank and offset end being held in parallel frictional engagement by pressure of the resilient means.

PETER C. SMITH.
DAVID I. STEPACOFF.

REFERENCES CITED

The following references are of record in the file of this patent:

UNITED STATES PATENTS

| Number | Name | Date |
|---|---|---|
| 690,659 | Ney | Jan. 7, 1902 |
| 1,827,188 | Burgess | Oct. 13, 1931 |

FOREIGN PATENTS

| Number | Country | Date |
|---|---|---|
| 266,807 | Germany | Oct. 31, 1913 |